July 28, 1953

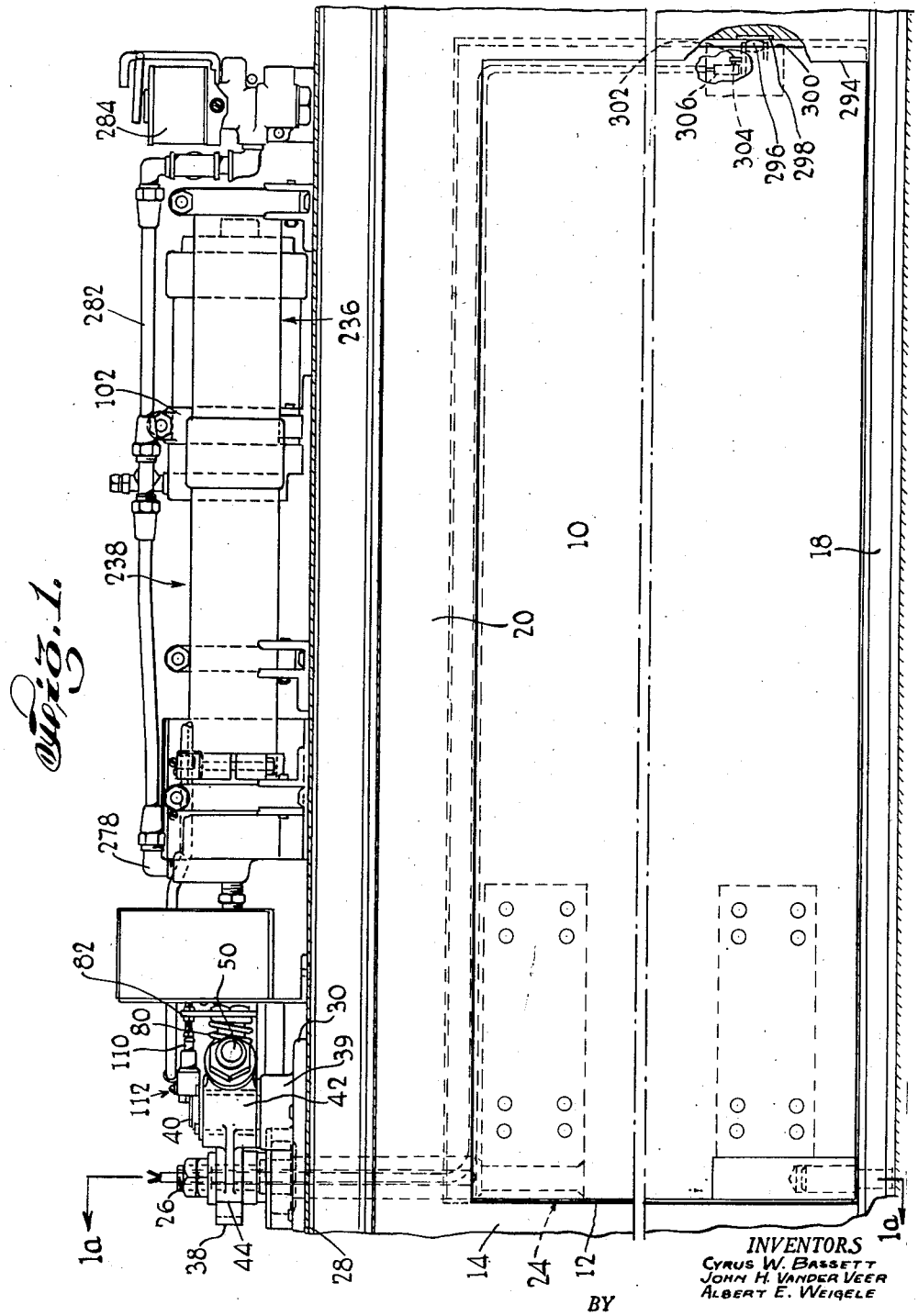

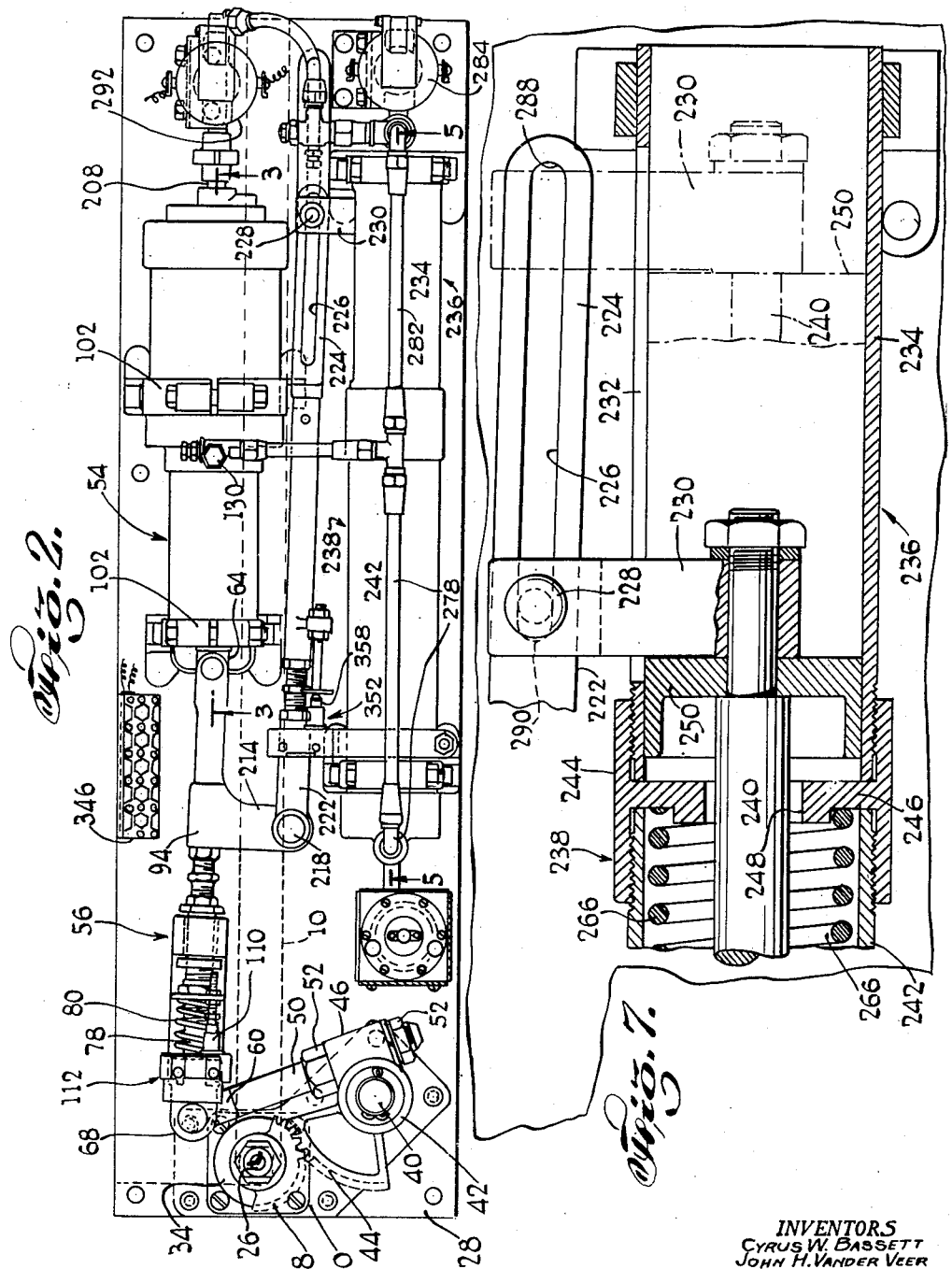

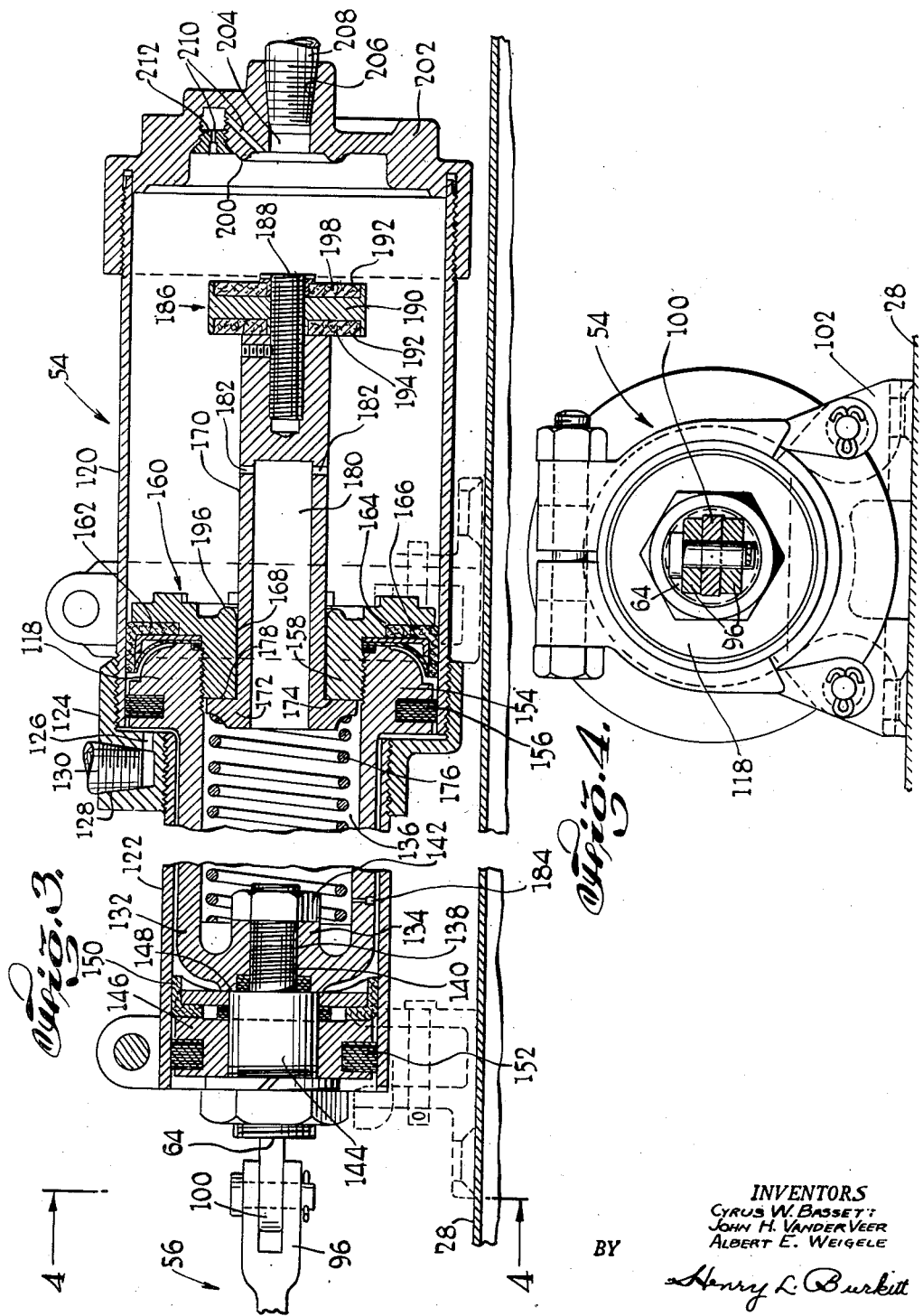

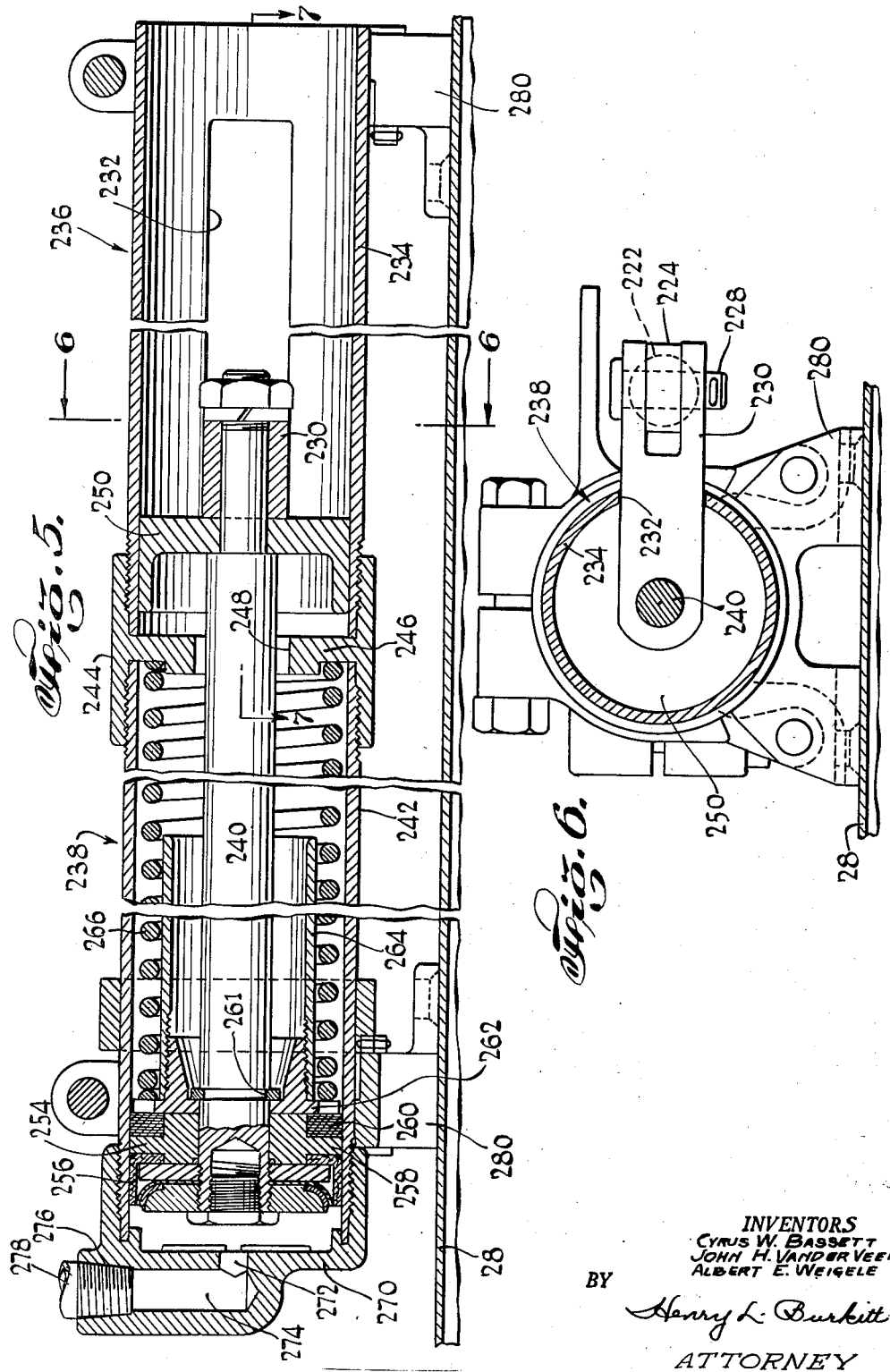

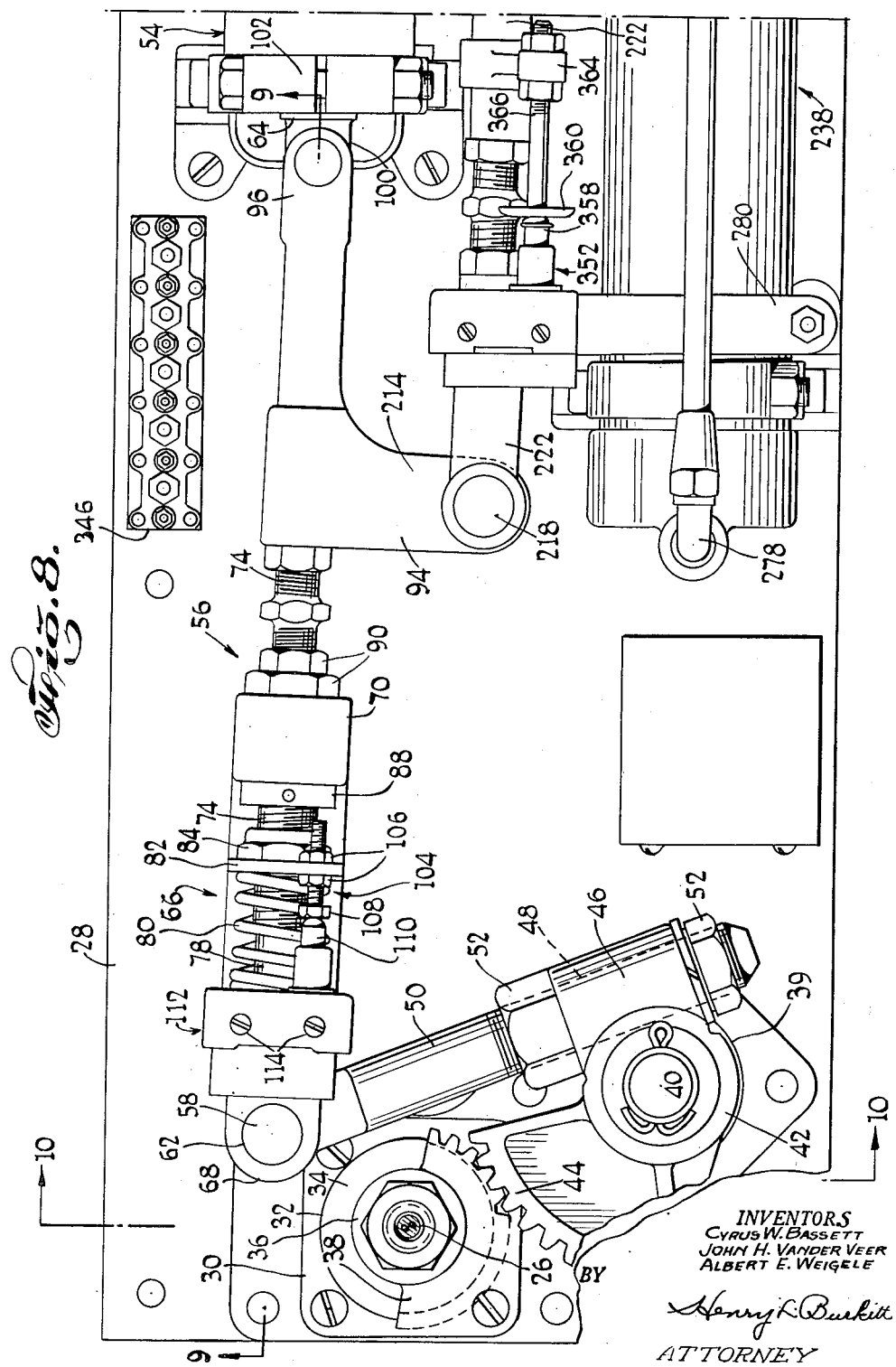

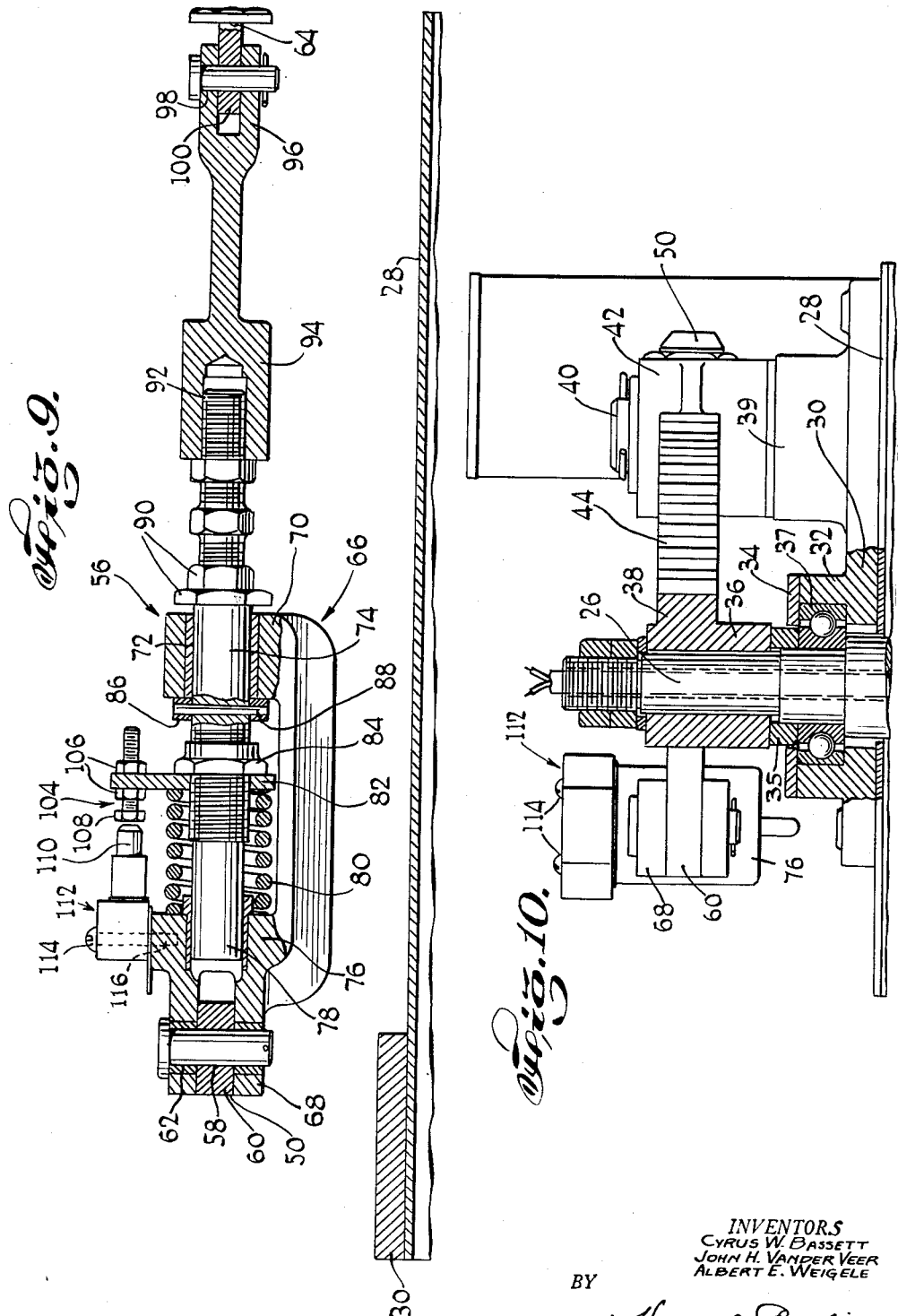

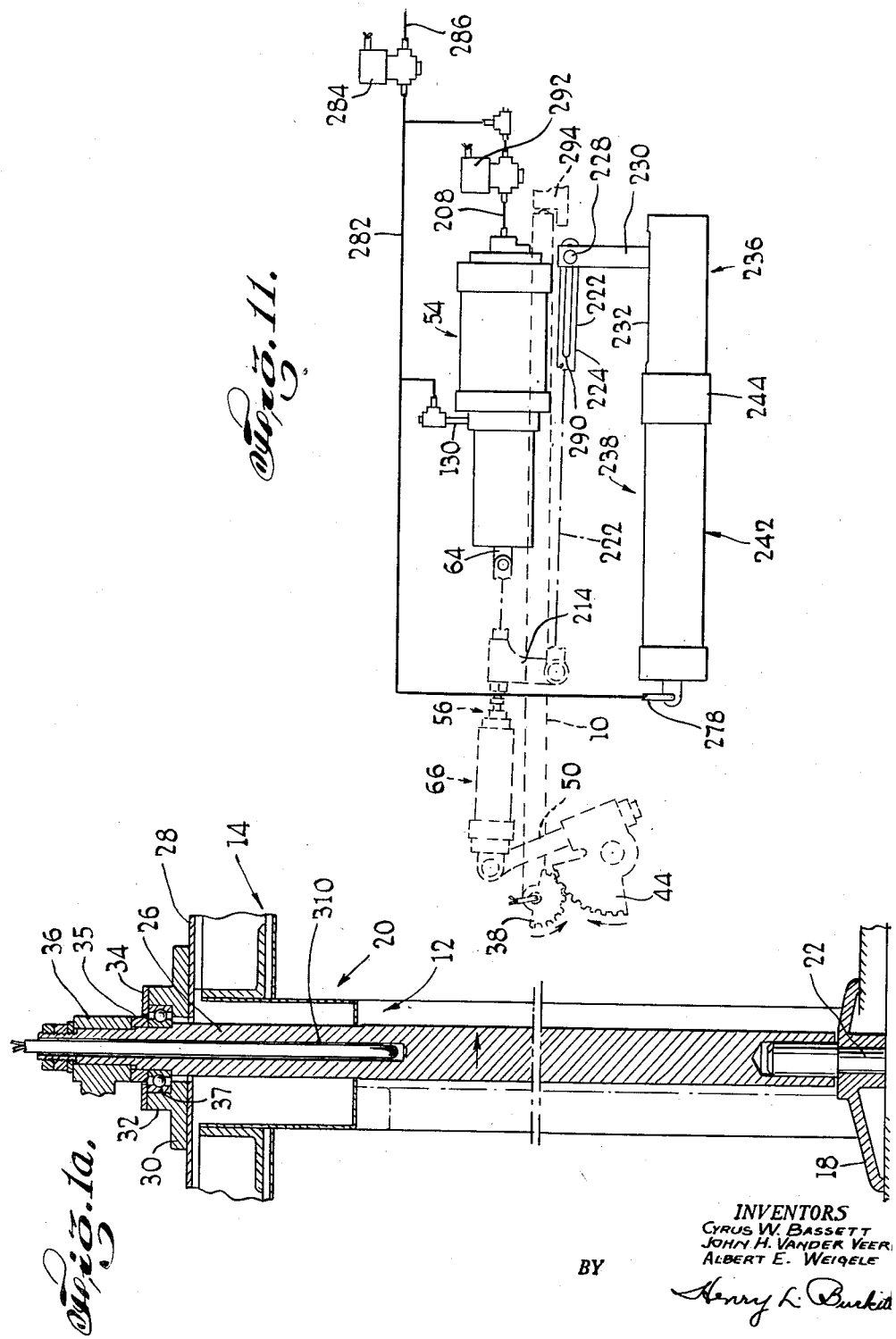

C. W. BASSETT ET AL 2,646,981

AUTOMATIC DOOR OPERATOR HAVING AUTOMATIC
MEANS FOR MANUAL OPERATION

Filed Dec. 17, 1947

INVENTOR.
CYRUS W. BASSETT
JOHN H. VANDER VEER
ALBERT E. WEIGELE

BY *Henry L. Burkitt*

ATTORNEY

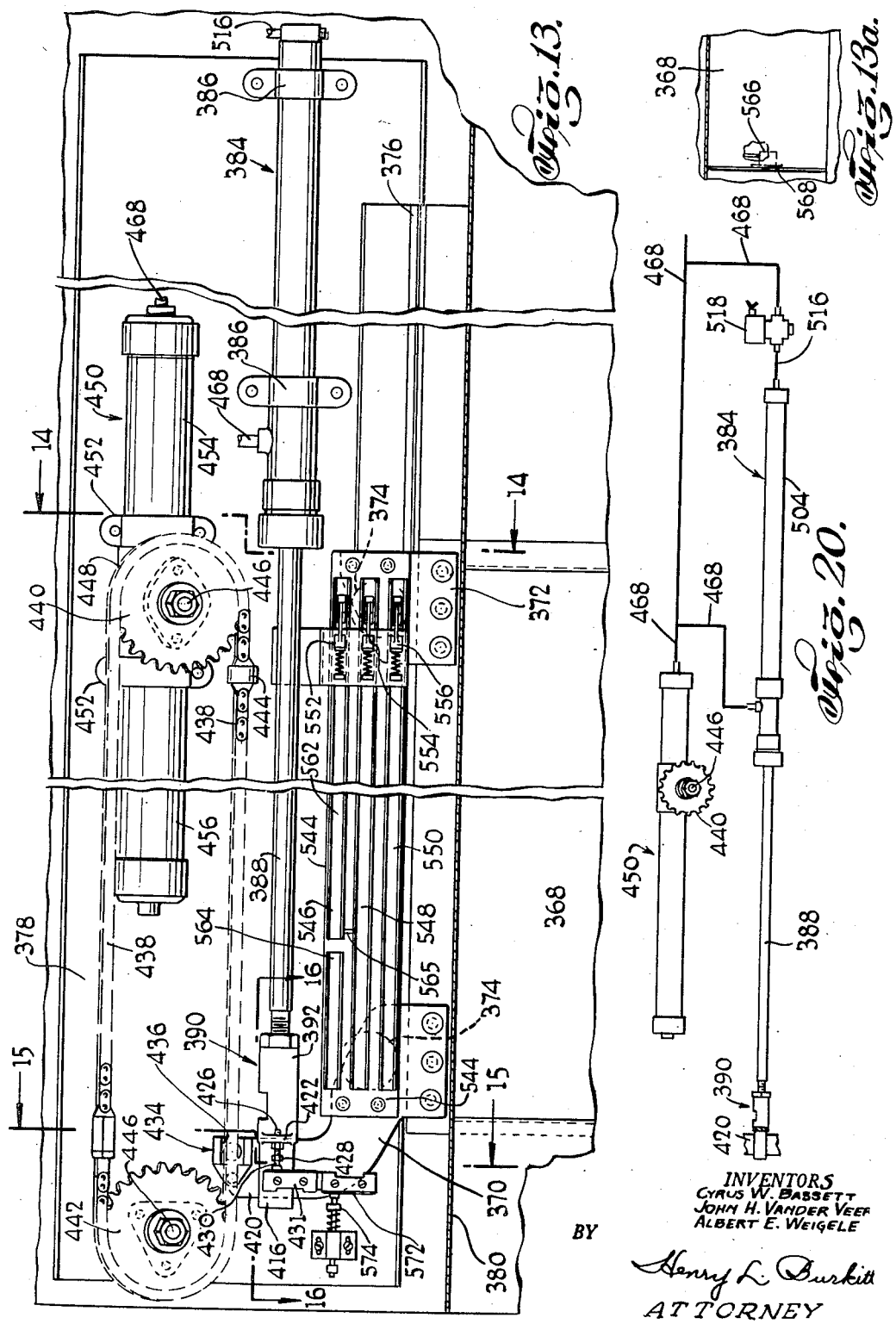

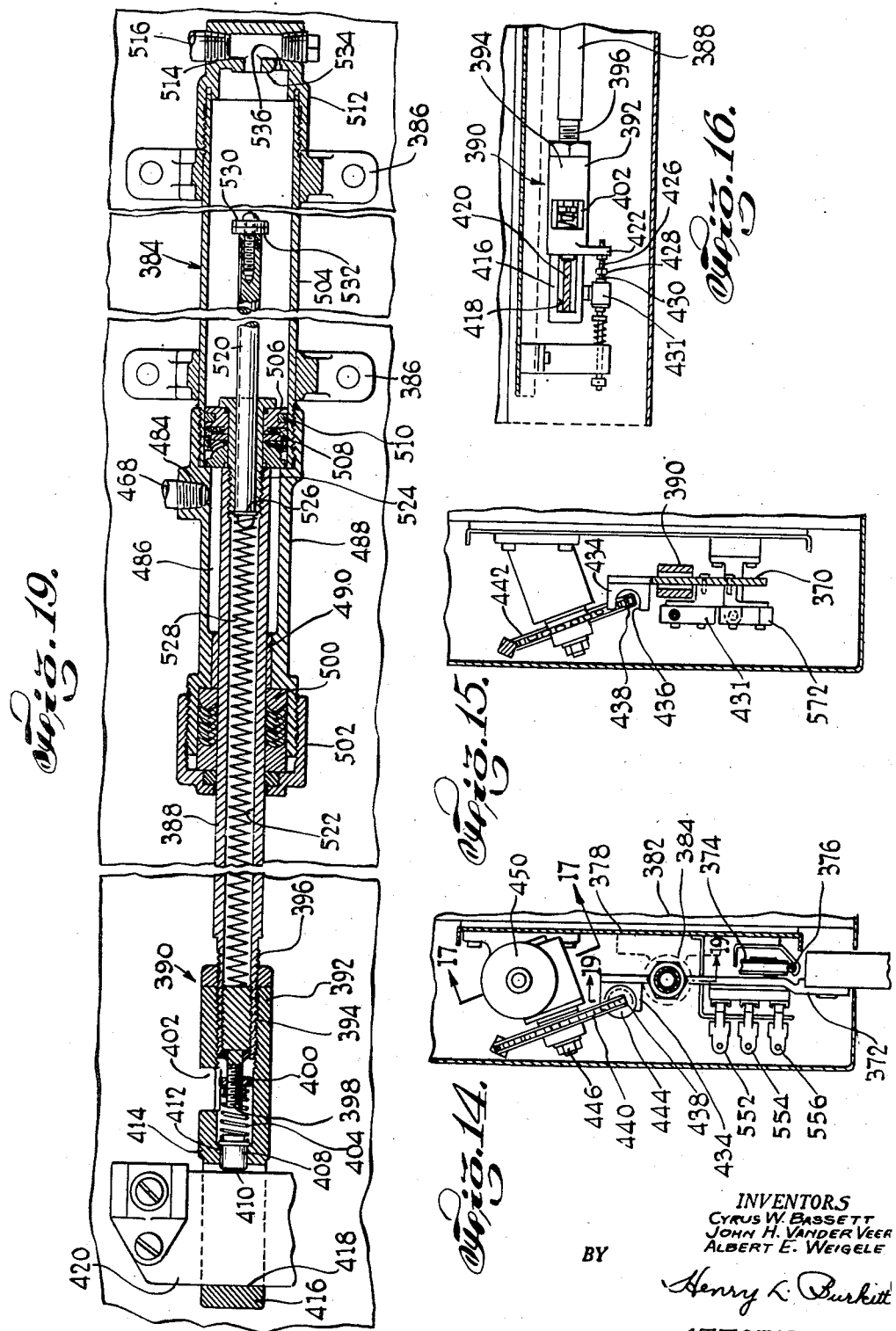

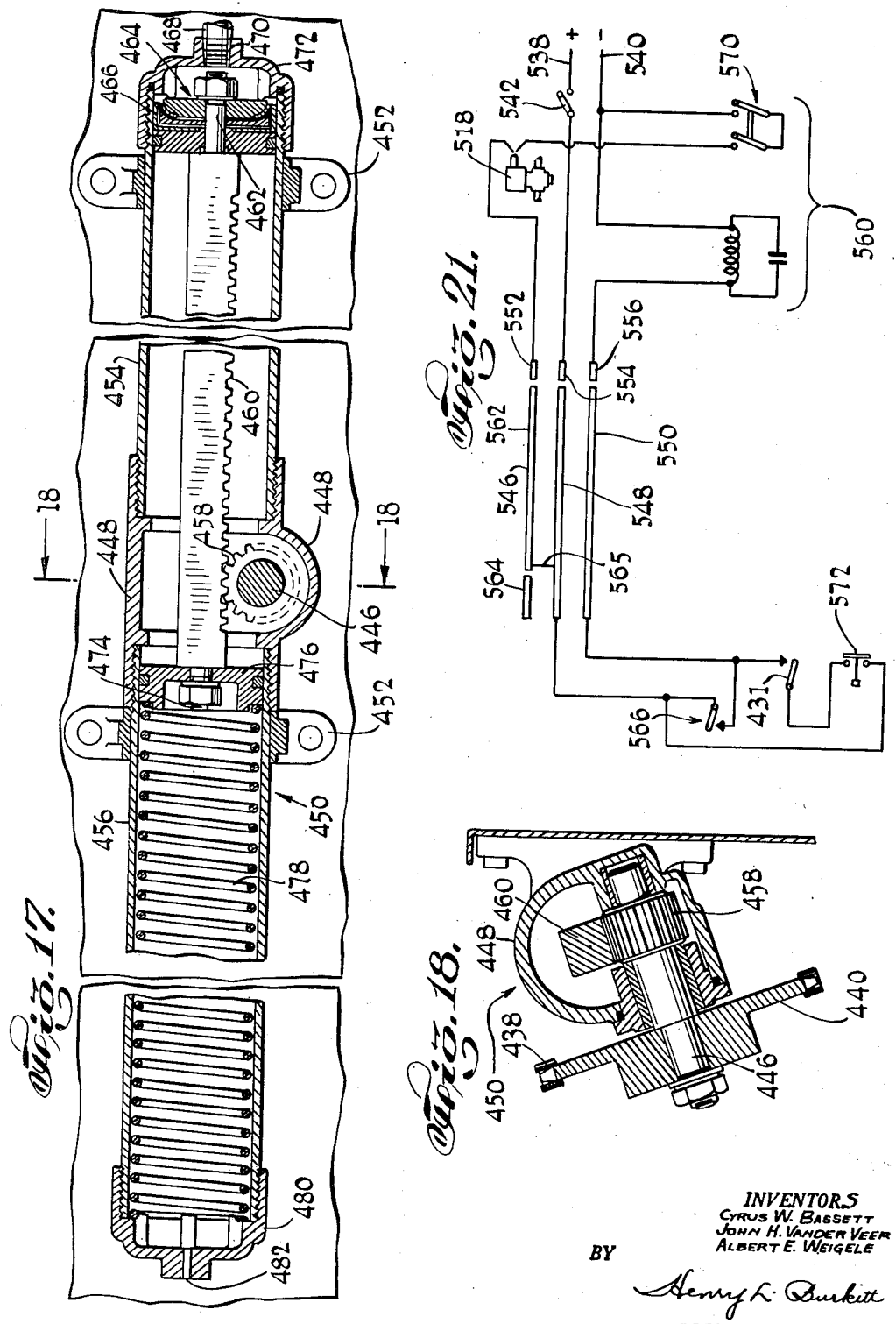

Patented July 28, 1953

2,646,981

UNITED STATES PATENT OFFICE 2,646,981

AUTOMATIC DOOR OPERATOR HAVING AUTOMATIC MEANS FOR MANUAL OPERATION

Cyrus W. Bassett, Monmouth County, John H. Vander Veer, Union County, and Albert E. Weigele, Essex County, N. J., assignors, by mesne assignments, to National Pneumatic Co., Inc., Boston, Mass., a corporation of Delaware Application December 17, 1947, Serial No. 792,258

4 Claims. (Cl. 268—66)

This invention relates to automatic door operators having automatic means for manual operation.

The invention is described here as developed for the operation of the end doors of vehicles such as railroad cars. The invention has application in many other connections.

The practice of conditioning the air of railroad cars has created the necessity for providing tighter seals for the door opening. For this purpose, heavier doors have become necessary for preventing leakage of the cooled air. This requirement, and the tight fitting of the door into its frame, when closed, necessary for this purpose, created the situation that ordinary passengers, in order to pass through such openings, had great difficulty in manipulating such doors.

It is an object of the invention to provide apparatus adapted for automatically operating doors where the manual power of the individual necessary for such operation is reduced to a minimum.

In situations where apparatus automatically to operate such doors has been made effective, there may arise the reverse situation where the motive means for such apparatus becomes disabled. In such instances, it generally is desirable to provide means automatically to close the door, as, for instance, a spring. Yet, at the same time, it would not be desirable to have such spring function in conjunction with the apparatus automatically to operate the door continuously. It is desirable to make such spring and its associated apparatus powerful enough to operate the door to closed position easily, and yet to be capable of manual operation for opening the door. The apparatus must be such that an ordinary person will be able to counteract the mechanical elements, to assure that such a door will not become a dangerous, insurmountable barrier to such a degree as to be impracticable for use on such vehicles. For instance, in one case, a pneumatic engine is used for opening and closing the door in response to actuation of initiating members by a passenger. If the power or control for the pneumatic engine should fail for some reason, it is requisite that the passenger be enabled to overcome the resistance of the usual elements, including the pneumatic engine, in order to open the door.

It is an object of the invention to provide means, in association with apparatus automatically to operate a door, which will be made normally inactive while power is applied to the apparatus, and then, upon power failure, or other deenergization of the motive means for the apparatus, will function so that the door may be used as an ordinary spring closed door, as if no such apparatus had been provided for its automatic operation.

It is an object of the invention to provide apparatus, functioning in conjunction with a door having motive means for opening it at a signal from a passenger, which apparatus is kept normally out of action, and which, immediately upon disabling of the power means for the door operating motive means, comes into action to assure that the door will normally be closed, and yet to permit the door to be moved to open position as if the door were controlled only by this apparatus, and without regard for the normal effectiveness of the motive means.

Other objects of the invention will be set forth hereinafter, or will be apparent from the description and the drawings, in which are illustrated embodiments exemplifying the invention.

The invention, however, is not intended to be restricted to any particular construction, or any particular arrangement of parts, or any particular application of any such construction or arrangement of parts, or any specific method of operation or use, or any of the various details thereof, even where specifically shown and described herein, as the same may be modified in various particulars, or may be applied in many varied relations, without departing from the spirit and scope of the claimed invention, of which the exemplifying embodiments, herein shown and described, are intended only to be illustrative, and only for the purpose of complying with the requirements of the Statutes for disclosure of an operative embodiment, but not to show all the various forms and modifications in which the invention might be embodied.

On the drawings, in which the same reference characters refer to the same parts throughout, and in which is disclosed such practical constructions, Fig. 1 is an elevational view illustrating an assembly including a door construction associated with a door frame, the assembly including apparatus for the operation of the door, and embodying the invention, a portion of the door construction being broken away in section to illustrate the arrangement of the door latch switch, and the door construction being broken away along its mid-section for clarity;

Fig. 1a is a vertical cross-sectional view, substantially on the line 1a—1a of Fig. 1, to illustrate the post construction for the door;

Fig. 2 is a plan view of the door operating apparatus shown in Fig. 1, the closed position of the door being shown by dotted lines;

Fig. 3 is a detail vertical cross-sectional view, substantially on the line 3—3 of Fig. 2, and to enlarged scale, illustrating the construction of the door-operating engine and associated parts, one of the cylinders being broken away to foreshorten the view for clarity, and the retaining clamps being shown in part by dotted lines;

Fig. 4 is a vertical cross-sectional view, substantially on the line 4—4 of Fig. 3;

Fig. 5 is a vertical cross-sectional view, substantially on the line 5—5 of Fig. 2, and to enlarged scale, illustrating the construction of the auxiliary engine;

Fig. 6 is a vertical cross-sectional view, substantially on the line 6—6 of Fig. 5, some of the parts being shown in elevation for clarity;

Fig. 7 is a vertical cross-sectional view of a portion of the auxiliary engine shown in Figs. 5 and 6, and parts associated with the engine at one end, in order to illustrate the arrangement of the loose motion, shown in part in elevation, the normal position of the pin and its associated piston rod in the operation of the apparatus being shown by dot-and-dash lines;

Fig. 8 is a detail of the plan view of Fig. 2, to enlarged scale, parts being broken away, illustrating details of the construction of the apparatus;

Fig. 9 is a detail, vertical cross-sectional view, substantially on the line 9—9 of Fig. 8, parts being shown in elevation for clarity;

Fig. 10 is a vertical cross-sectional view, substantially on the line 10—10 of Fig. 8;

Fig. 11 is a schematic diagram, illustrating the arrangement of piping for delivery of air under pressure to the various parts of the apparatus;

Fig. 12 is a wiring diagram for the apparatus shown in Fig. 1, some of the parts being shown diagrammatically;

Fig. 13 is an elevational view of a modification of the apparatus, particularly related to the operation of a sliding door;

Fig. 13a is a detail elevational view, to reduced scale, to illustrate the position of an operating plate for the apparatus of Fig. 13, the apparatus being broken away to foreshorten the illustration, and the door being broken away;

Fig. 14 is a vertical cross-sectional view, substantially on the line 14—14 of Fig. 13;

Fig. 15 is a vertical cross-sectional view, substantially on the line 15—15 of Fig. 13;

Fig. 16 is a horizontal cross-sectional view, substantially on the line 16—16 of Fig. 13, illustrating the association of parts of a detail of the apparatus;

Fig. 17 is a detail cross-sectional view, substantially on the line 17—17 of Fig. 14, and to enlarged scale, to illustrate the construction and arrangement of parts in the auxiliary engine of Fig. 13, certain of the parts being illustrated as if in a vertical cross-sectional view;

Fig. 18 is a vertical cross-sectional view, substantially on the line 18—18 of Fig. 17;

Fig. 19 is a vertical cross-sectional view, substantially on the line 19—19 of Fig. 14, and to enlarged scale, illustrating the construction of the main engine;

Fig. 20 is a schematic diagram, illustrating the arrangement of the piping for the supply of air under pressure to the various parts of the apparatus of Fig. 13; and Fig. 21 is a wiring diagram for the apparatus of Fig. 13, parts of the apparatus being shown schematically.

A door 10, as shown on the drawings, is positioned at an opening 12 in door frame 14, forming a part of an end wall of a vehicle, as, for instance, a railroad car. At opening 12 and in association with frame 14, a threshold 18 and a rail 20 may be associated. The threshold may be formed to provide a bearing for a pintle 22 extending downwardly from the bottom of the door. The door may be constructed in any desired manner. In the instance shown, the door is of metallic construction, the pivoting end 24 being rounded, and having a shaft 26 fitted into the body of the door at that point. The shaft extends above the top edge of the door to a position above the rail 20. At the top face of the rail is mounted a base plate 28. Plate 28 provides a foundation for the apparatus to be described. In the particular instance illustrated, a main door actuating assembly base plate 30 is mounted upon plate 28. Then, at one end of plate 30 is formed a hub 32. Shaft 26 extends through an opening in plates 28 and 30 and hub 32.

Hub 32 is formed as a part of a ball bearing race. The inner portion of the ball bearing race may be a part of the shaft. A plate 34 closes the race. A collar 35 fits into an opening in plate 34, and rests upon the ball retainer 37, and, in turn, serves as a support for the hub 36 of a segment gear 38 received on the shaft. The gear may be formed as a part of hub 36, and is locked to rotate with the shaft. Suitable means, such as lock nuts, serves to retain the gear against movement along the shaft.

At the end of plate 30 away from hub 32 is formed a boss 39 in an opening in which is fixed a pin 40. Upon this pin is mounted a hub 42 of a spur gear segment 44. Segment 44 is permitted rotation upon pin 40, and is held against separation from the pin by means of suitable washers and cotter pins. Segment gear 38 and gear segment 44 are proportioned so that, on the centers of shaft 26 and pin 40, they are enmeshed, and function as a drive to multiply the arcuate movement of segment gear 38, and, therefore, of door 10, secured to move therewith, to arcuate movement greater than that of gear segment 44.

Hub 42 includes an arm 46 formed with a socket 48 to which may extend the end of a rod 50. Rod 50 is held in place with relation to arm 46 by means of lock nuts 52 tightened up on the threaded end of rod 50. Lock nuts 52 provide for adjustment of rod 50 relatively to its associated apparatus, and especially in determining the position of door 10 with relation to the limits set for engine 54. Rod 50 is provided pivoting connection with a connector assembly 56 by any suitable means, such as a pin extending through a bearing hole 58 in ear 60 on rod 50 and a similar hole 62 in the end of assembly 56. Thus is provided means for pivoting movement of the parts with relation to each other.

Connector assembly 56, which provides connection between rod 50 and piston rod 64, may include a frame 66 having a two armed yoke 68 at one end. Ear 60 is received between the arms of the yoke; a pin is received through the respective holes 58 and 62. Frame 66 is somewhat of the form of a U, one arm 70 of the U having a passage 72 formed therethrough. Rod 74 extends through passage 72. In the other arm 76 of the U is formed a seat to receive the end 78 of rod 74 formed to permit sliding movement of the end in the seat. Encircling rod 74 is a coiled spring 80 which bears against the wall of arm 76 and against a plate 82. Rod 74 extends through an opening in plate 82. At the plate, the rod is threaded, and receives a nut 84, which can be adjusted to determine the position of plate 82 relative to the rod.

Also received upon rod 74 is a collar 86 which, by means of a taper pin 88, extended through related openings in collar 86 and rod 74, locks these parts together. The collar then serves to limit movement of the rod with relation to frame 66. Beyond arm 70, a pair of lock nuts 90 are provided on rod 74 as another limit for movement of the rod. The limits of movement of rod 74 with relation to frame 66 are thus set by collar 86 and lock nuts 90.

Rod 74 terminates in a threaded portion which is received in a threaded socket 92 formed in an L-shaped connector 94. The rod is locked in that position by means of a suitable lock nut. Connector 94 has a forked arm 96, the parts of which are provided with openings 98. Between the parts of the forked arm, the end piece 100 of piston rod 64 of engine 54 is positioned and pinned for pivoting movement. While the power means illustrated is a differential pneumatic engine, it will be understood that any other suitable power means capable of energizing the apparatus here described may be used. In the construction shown, engine 54 is mounted upon plate 28. In the specific structure shown, the engine is held in place by straps 102 which encircle the body of the engine, and are anchored to suitable brackets provided for that purpose upon plate 28.

At a position on plate 82 beyond the bounds of spring 80 is positioned a contactor 104. Contactor 104 is here shown in the form of a headed screw passed through an opening in plate 82, held adjustably in position by means of lock nuts 106 positioned on opposite sides of the plate. In this manner, the position of head 108 of the screw is adjustable with relation to button 110 or other suitable actuator member of a sensitive switch 112, which is actuated upon very slight movement of an actuating device such as button 110. Switch 112 is secured in position with relation to head 108 in any preferred manner. In this case, it is held in position by a screw 114 which passes through the insulated body of the switch and is received in a threaded opening 116 in arm 76.

Switch 112 may be a microswitch having a very light spring in its composition. Spring 80 is of a construction heavy enough that, on delivery of force of usual degree to arm 96 through piston assembly 118 of engine 54, spring 80 will act as if it were a rigid member, and will transmit force directly from rod 74 to arm 76, and thus to rod 50, without appreciable compression of the spring. However, if resistance to the movement of door 10 is encountered, as, for instance, if someone gets in the way of the door as it closes, and should resist completion of the closing movement of the door, power will continue to be delivered by the engine through connector 94, and plate 82 will continue to move. Spring 80 will resist such movement, and will be compressed slightly, just sufficiently so that head 108 will engage button 110 and actuate switch 112, causing that switch to affect the circuit it controls in a manner to be described hereinafter.

Engine 54 may be of any suitable construction. The engine for carrying out certain purposes in connection with apparatus of this type is shown to include a large cylinder 120 and a small cylinder 122, held together by a coupling 124 secured to the two cylinders in any desired manner, as, for instance, by suitable threading. A passage 126 in the coupling which is positioned to be directed toward cylinder 120 also communicates with a screw threaded port 128 with which a conduit 130 may be connected.

Within the two cylinders is mounted piston assembly 118 which, in this case, includes a tubular member 132 having a hub 134 extending from its smaller end into bore 136 of member 132. This hub has an opening 138 therethrough into which is received a member 140, the end of which extends through opening 138 and receives a nut 142 to hold member 140 in place with relation to the piston assembly. Portion 144 of member 140 is provided with means to prevent leakage of air past it, and also with means for locking the parts of piston 146 with relation to member 140. In this case, the parts are anchored against a shoulder 148 formed at the end of member 132 outside of opening 138.

Around portion 144 are assembled the elements, including the leather cup member 150 and the usual compressor parts of piston 146, the parts being held in position by suitable means, such as a lock washer and a lock nut.

Leather cup 150 may then function in connection with small cylinder 122. A lubricating ring 152 of any suitable type may be associated with cup 150. Beyond portion 144, member 140 becomes end piece 100 for connection to forked arm 96.

The end of member 132 removed from piston 146 is enlarged into a head 154 which is recessed for the reception of packing 156. Bore 136 is threaded at this end to receive the threaded neck 158 of compressor 160. Between compressor 160 and the end wall of head 154 is received a leather cup member 162 for a piston 164 to move in the larger cylinder 120. The leather cup member is held in place by any suitable means such as a clamp washer 166. Compressor 160 is also formed with a passage 168 in which is slidably disposed a sleeve 170 having an enlarged section 172 providing a shoulder 174. A coiled spring 176 housed within bore 136 has one of its ends seated around hub 134 and against the end of member 132 at the hub. The other end of the spring is seated against enlarged section 172. Thus spring 176 tends to drive sleeve 170 out of bore 136, and is stopped in its movement in one direction by engagement of shoulder 174 against end face 178 of neck 158.

Sleeve 170 is formed with a passage 180 extending the greater part of its length. Openings 182, at one end of passage 180, provide communication between passage 180 and cylinder 120. In the wall of tubular member 132, one or more openings 184 are provided for direct communication between bore 136 and the chamber outside of member 132 in both cylinders as the piston assembly moves within the engine.

Beyond openings 182, sleeve 170 carries a valve member 186 which may be held in place by any suitable means, such as a securing device 188. Valve member 186 may include a valve plate 190 having a pair of recesses 192 at opposed faces. In these recesses are positioned valve seating material of any suitable composition. On one face, the material provides a valve seat 194 for engagement with a valve seat 196 formed on compressor 160. A valve seat 198 at the other face of member 186 is positioned to engage with a seat 200 formed in an end cap 202 threaded or otherwise retained in position at the end of cylinder 120. Seat 200 surrounds an opening 204 which leads to a threaded port 206 to which is coupled a conduit 208. A by-pass duct 210 opens into cylinder 120 beyond seat 200 and communicates with opening 204. The effect of flow through duct 210 may be controlled by a flow restricting member 212 threadedly received in duct 210.

In the operation of the engine, air is supplied constantly to both cylinders 120 and 122 through port 128, by means to be described, when the air and electric power means are working properly. Air entering at port 128 acts upon both pistons 146 and 164. Since piston 164 is the larger, the piston assembly will be caused to move toward cap 202. Movement in this direction, as will be seen from the drawings, causes the piston assembly to move into the engine, thus drawing connector assembly 56 with it, and causing door 10 to move to open position.

On certain occasions, as determined by the operation of the apparatus, air is admitted not only at port 128 but also at port 206. Now the differential of pressure is in the other direction, since air pressure is now acting upon both faces of piston 164 as well as upon the one face of piston 146. Now the piston assembly will reverse its direction of movement, and push connector assembly 56 in the opposite direction, and will continue to do that until the door is closed, provided interference with the movement of the door does not take place.

When port 206, by apparatus to be described, is open to the atmosphere, and air under pressure is being delivered to port 128, the piston assembly rushes under the full impact of pressure between pistons 146 and 164, to move the door to fully open position. This movement continues, with the full opening of port 206 available for this purpose, until seat 198 engages against seat 200, thus cutting off unrestricted flow of air to the atmosphere from cylinder 120. Now air may pass only through the restricted passage provided by duct 210. At this stage, it should be noted that throughout the operation of the apparatus, when sleeve 170 is free of seat 196, air may leak directly from the chamber formed around member 132 through openings 184, into bore 136 and passage 180, and then into cylinder 120 through openings 182. Thus, even though substantially all the air in cylinder 120 was exhausted to the atmosphere as soon as port 206 was opened, now that port 206 is closed by the engagement of seats 198 and 200, and the only outlet for air from cylinder 120 is through duct 210, this leakage will assure that some air under some pressure will be present in cylinder 120 throughout continued movement of the piston assembly to the position where the door is fully open. Thus, if anyone should interfere with the opening movement of the door at any of its stages, this leakage of air into cylinder 120 will build up a pressure within cylinder 120 and against piston 164 to assure that, when this resistance to the opening movement is released, the door will not jump in the opening direction, but will continue smoothly in its movement to fully open position. Thus the danger that someone using the door will be struck by the door on such release is removed. The building up of pressure in cylinder 120 thus counteracts the built up force from the resistance interposed to the continued movement of the door.

Now, as the door tends to move to fully open position, sleeve 170 continues to compress spring 176; seat 198 continues in engagement with seat 200. During all of this operation, air leaks into cylinder 120 through openings 182, even after openings 182 are covered up by their movement within passage 168, since the fit of sleeve 170 within passage 168, while close, is not close enough to prevent such air leakage. Now, however, when seats 194 and 196 engage, the movement of the piston assembly has been completed, and further leakage of air from bore 136 is stopped.

On the other arm 214 of connector 94 is provided a bearing opening to receive a pin 218, held in position in any suitable manner, and also received in an opening in the end of a link 222, so that this link may move with piston assembly 118. Link 222 may be made up in any desired manner, with adjusting means for its length, terminating in a section 224 having a slot 226 to receive a pin 228 fixed to an arm 230 which extends through a slot 232 in a wall 234 of a cylinder 236 of an engine 238. Slot 232 provides limits for the movement of arm 230 and rod 240 to which the arm is secured in any desired manner, as, for instance, by threading the end of the rod, passing that threaded end through a hole in the arm, and locking the arm in place by a suitable nut on the threaded end of the rod.

Engine 238 may comprise a pair of cylinders 236 and 242, held together in alignment in any desired manner, as, for instance, by the provision of threads between a coupling 244 and the cylinders. The coupling may have a wall 246 provided with an opening 248 through which may pass rod 240. Within cylinder 236 a piston 250 may be retained in position, spaced from arm 230 in any desired manner. In this case, the piston is actually a cup, acting merely as a guide. At the end of rod 240 within cylinder 242 is a piston construction 254 which may take any desired form so that a leather cup 256 is retained in position to cooperate with the walls of cylinder 242.

Rod 240 at that end is tapered and then threaded to receive a cup-retaining assembly which backs leather cup 256 against a ring 258 which, in turn, holds additional packing 260 which is backed up against a spring retainer 262. This retainer is held in position upon rod 240 by a snap ring 261, and is itself threaded to receive and retain a sleeve 264 which extends into the bore of cylinder 242. A spring 266 is engaged between retainer 262 and, at the other end of cylinder 242, against wall 246. Sleeve 264 functions to keep the spring properly aligned so that it can be compressed in the manner to be described.

End cap 270 is secured on cylinder 242 in any suitable manner, the cap having a port 272 communicating with a duct 274 leading to a threaded opening 276 to which a conduit 278 may be connected. Engine 238 is held in place upon plate 28 by any suitable means, as, for instance, brackets 280.

Conduit 278, by suitable conduit means, is connected with conduit 130; from the union of the two conduits, a single conduit 282 leads to an electrically operated valve 284, commonly known in the industry as a "magnet valve." This valve may be of any desired construction, but, in this case, valve 284 is constructed so that, when electrical energy is applied to the valve, the valve will supply air under pressure from a suitable reservoir, conducted to the apparatus through line 286. When electrical power is cut off from the coil of the valve, valve 284 will be actuated to open a port leading to the atmosphere for communication with conduit 282, and permit air under pressure to move from conduits 130 and 278, which the parts of the engines with which they are connected, to exhaust to the atmosphere.

During the normal operation of this apparatus, and except where emergencies arise, valve 284 is constantly energized by the circuit to be discussed, so that air is constantly supplied to conduit 282, and thus to piston construction 254 and to piston assembly 118 through port 128. Under such circumstances, piston construction 254 will move so as to compress spring 266, moving arm 230 to the limit of slot 232, and thus moving pin 228 to the extreme right hand end of slot 226, as illustrated in Fig. 11. On the other hand, if, after the apparatus has been energized, power should fail for any reason, valve 284 will be deenergized, and air will be permitted to exhaust from cylinder 242. Spring 266 will act to move piston construction 254 toward cap 270. Pin 228, which, when piston construction 254 was effective, had been moved to the right, as shown in Fig. 11, to engage with, or to be closely adjacent, end wall 288 of slot 226, will now, when valve 284 is deenergized, move to the left-hand end of slot 226, as shown in Fig. 7, where it will engage end wall 290 of slot 226. When pin 228 was held in the position of Fig. 11, when the valve was energized, the movement of link 222 was without effect as pin 228 was out of the range of the ends of the slot, and moved only within the slot without engaging the end walls of the slot to cause any movement of the link, regardless of the degree of movement of link 222 under the action of connector 94 driven by piston assembly 118. With the release of air pressure upon piston construction 254, if door 10 had been opened by engine 54 prior to such deenergization of valve 284, spring 266 would now become effective, pin 228 engaging wall 290, and moving link 222, and thereby frame 66, and through it, segment gear 38 and the door secured to move with it, to move the door to closed position. Thereafter the door could be operated as an ordinary spring closed door, since piston construction 254 no longer would interfere with the operation of the spring, and pin 228 would remain engaged against wall 290.

The air supplied for conduit 208 is obtained from another magnet valve 292. Magnet valve 292 is preferably of the type which, when energized electrically, opens a port to the atmosphere, so that air will exhaust from conduit 208. When, however, electric power is cut off, this valve 292 operates to open a port leading, by suitable connections, to conduit 282, and then to supply air under pressure to conduit 208 so long as valve 284 is energized. When air is supplied to conduit 208, the piston assembly 118 is caused to move to close the door. While the air supply to valve 292 may be directly from the reservoir, it has been found very desirable to control all air supplied for the operation of the apparatus by a single valve 284. In this manner, while valve 284 is energized, air is supplied to the apparatus for the operation of engine 54 as well as for supplying air constantly to auxiliary engine 238. When power fails, and, therefore, valve 284 is deenergized, the air supplied to the entire apparatus, including valve 292, is cut off. At this stage, the apparatus is made effective to operate without pneumatic means.

In order to control the operation of this apparatus in accordance with the passage of persons through the door, suitable control means may be positioned either upon stile 294 of frame 14, or upon the door itself. It is desirable that the person coming to the door should proceed to operate it in the same manner as that with which he has been accustomed in the past. For this purpose, suitable actuating mechanism may be positioned upon the door itself. Such mechanism is shown in this case in conjunction with means for withdrawing the bolt 296 from the strike 298. Bolt 296 is shown to be slidable in a housing 300, and to be returned to normal position by suitable resilient means. Carried by the bolt may be a finger 302 positioned to engage with an actuator 304 which may take the form of a button extending from a casing in which are housed the elements of a switch 306. Thus, when the usual handle or push plate is engaged and rotated or pushed by the person attempting to open the door, bolt 296 will be slid to bring finger 302 into position for driving actuator 304 to close the circuit to be described. The time consumed in closing the circuit of switch 306 will be substantially the same as that consumed in withdrawing the bolt from the strike. The energization of the circuit will thus be completed at the time the door is released from the engagement of bolt and strike so that the operation to be described may then proceed seriatim without further control of the person seeking to pass through the door opening.

The circuit completed by switch 306 is shown in the wiring diagram of Fig. 12, where it will be seen that switch 306 is in the circuit of a switch 308 which is in the nature of a time-delay relay. The wiring from switch 306 may be carried from housing 300 through door 10 through the bore 310 provided in shaft 26, and then up through the bore to a position above plate 28 to enter into the wiring at this position where the controls for the door operating mechanism are located. Switch 308 may take any desired form. As shown in Fig. 12, it may include a spindle 312 functioning as the plunger of a solenoid 314. Normally the spindle, by means of a spring 316, is at the lowermost position at which its insulated end 318 keeps contacts 320 and 322 in position to break the circuit between them. The spindle, at its upper end, engages against a bellows 324 or similar air chamber forming means. One wall of the bellows has a perforation 326 formed therein. A threadedly adjustable member 328 provides means for varying the effective passage of air through perforation 326. When current is supplied to the coil of the solenoid of this relay by closing switch 306, spindle 312 is moved to compress the bellows and cause air to discharge from the bellows through perforation 326. The first action, however, has been to complete the circuit across contacts 320 and 322 by means of a contactor which is biased by suitable means, such as a spring, to close the circuit across these contacts. Just as soon as the circuit at switch 306 is broken, spindle 312 is permitted to move under the action of spring 316. This movement, however, will be retarded by the movement of air into the bellows through perforation 326. This air movement can be adjusted for the purpose of timing the return of the spindle to its lowermost position. When the spindle reaches its lowermost position, end 318 will break the circuit across contacts 320 and 322.

Supplied with the apparatus is a switch 330 which has three positions, which are here designated as "Door open" position, the "Manual" position and the "Automatic" position. This switch, which may be considered, for the purposes of this illustration, as the main switch of the apparatus, controls power from the power mains 332 and 334. The switch is shown diagrammatically as its specific construction does not enter into the specific phases of the invention, and may be considered to have a sliding contact 336 to engage with a plurality of terminals 338, 340 and 342. One terminal 338 is connected to a terminal 344 on a terminal board 346, and from there to contact 320. The other terminal 342 of switch 330 is led to a terminal 348 on terminal board 346, and then to the other contact 322.

Terminal 350 on board 346 is connected to main 334. To this same terminal is connected one end of the solenoid coil of switch 308 as well as the ends of the solenoid coils of valves 284 and 292. Terminal 354 on board 346 is connected to one terminal at switch 306, that same terminal being connected to the other terminal of the coil of switch 308. The other terminal at switch 306 is connected to terminal 344. Terminal 344 is also connected to one of the contacts of a reversing cut-out switch 352 mounted to be operated by the door operating mechanism in a manner to be described. Terminal 344 is also connected to the other terminal of the coil of magnet valve 284. Terminal 348 is also connected to the other terminal of the coil of valve 292. The other terminal of switch 352 is connected to the final terminal 356 on board 346, and terminal 356 is also connected to one of the terminals of switch 112. The other terminal of switch 112 is connected to terminal 354.

Now the circuit can be traced simply. Switch 330 may be positioned in any desired relation to the car with which the door operating apparatus is associated. It is intended to be set by an operator, such as the porter usually assigned to such cars. The usual setting of such a switch will be that where the two terminals 338 and 340 are connected together, and terminal 342 is left unconnected, the "Automatic" position. When the main switch for power supplied to the apparatus is closed, valve 284 is immediately energized, causing air to flow to conduit 282. This results, if no other actuation has taken place up to that point except the setting of switch 330 as just indicated, in causing piston construction 254 to compress spring 266, and thus place the operating parts associated therewith, that is, pin 228 and its portion in slot 226, out of action for the time being. At the same time, piston assembly 118 is made effective to close the door, if it is open, or to retain it closed, if it is already closed.

Now when a person approaches and operates the push plate or other device for moving bolt 296, switch 306 will be closed, energizing the solenoid coil of switch 308 so that spindle 312 will rise, compressing the bellows and forcing air out of it. At the same time, the circuit is closed across contacts 320 and 322, which is the circuit for the solenoid of valve 292. Valve 292 will now open cylinder 120 to the exhaust port to discharge to the atmosphere. Thereupon the pressure between pistons 146 and 164 will cause piston assembly 118 to move to such position that the door will be moved to open position. If the person holding the handle or other operating device has released that device, or the device is moved with the door away from the hand of the person, the operating parts of the mechanism will still go through the series of steps defined for their operation, since switch 308 remains closed, as the time lag derived from the slowly falling spindle 312 permits that circuit to remain closed for a time period determined in accordance with the setting of member 328. Now, however, as the door opens to its limit, as determined by the capacity of engine 54, there will finally come the time when spindle 312 will return to a position to break the circuit between contacts 320 and 322. Immediately pressure will be reestablished at valve 292, and piston assembly 118 will now move to close the door.

If someone should come into contact with the door as it proceeds to close, and any appreciable resistance should be set up to the return of the door to closed position, as, for instance, if someone should put out his hand to hold the door against closing with the intention of going through the door opening, that resistance will be sufficient to cause the loose motion which includes spring 80 to be compressed. This compression of the spring also means that there will be resilient travel of the parts including that spring, so that switch 112 finally will be closed. The closing of that switch closes a circuit through the normally closed switch 352 and again energizes the solenoid of switch 308, and again energizes the coil of valve 292. Again the door moves to open position, and repeats the cycle. This recycling of the door will continue so long as someone resists the movement of the door to closed position, or if anyone should strike the push plate or otherwise operate switch 306. Finally, however, the door will move to completely closed position. Just as the door moves to engage the bolt in the strike, and thus necessarily to set up resistance at spring 80, it might cause reversing of the closing movement. Switch 352 then goes into action.

Switch 352 may take the form of any small movement switch commonly available, and may have a button 358 extending into position for engagement by a strike plate 360. The body of switch 352 may be supported in position upon plate 28 in any desired manner; it is here shown as positioned upon one of brackets 280 so that its button is in position to be engaged by strike plate 360 which is retained in an ear 364 formed as a part of or secured upon link 222. Plate 360 is formed with a threaded rod 366 which, by means of nuts on either side of the ear, may be locked in position. Also its position may be adjusted to determine the moment at which switch 352 comes into effect. Thus, switch 352 may be timed to break the circuit through switch 112 just as that switch is being actuated when link 222 and its associated parts have arrived almost at the very limit of movement as the door reaches the last stage of pushing the bolt into the strike. This switch will break the circuit so that switch 112 is made ineffective to open the door again at that point.

Spring 266, throughout this operation, has been kept under control by the actuation of piston construction 254 to the limit of its movement with the energization of valve 284. If at any time there should be a power failure, so that valve 284 would close, then no air would be supplied, piston construction 254 would be relieved of its air pressure, and spring 266 would go into action, closing the door. However, since all air pressure has been removed from the apparatus, the door may now be moved by hand, spring 266 merely providing the usual resistance, and assuring that the door will return to closed position. Likewise, if there should be a failure of air pressure for any reason, even though electric current should be supplied continuously to the apparatus, a similar result will occur, as the air pressure against piston 254 will fail, thus releasing spring 266 for further operation in the manner indicated. Engine 54 will likewise be released from the action of the air under pressure and will not resist the opening and closing of the door by anyone by hand, or the operation of spring 266 to close the door.

There may come times when it is desired to relieve the apparatus of this operation under the action of the electric circuit and air pressure. The operator may obtain the result desired by moving switch 330 to the position indicated as "Manual," in which case all of terminals 338, 340 and 342, are disconnected, and none of the functions of the apparatus heretofore considered are carried out, except that the door operates as an ordinary spring operated door under control of spring 266.

At certain times, the operator may desire to keep the door open continuously. For this purpose, he moves switch 330 to the position indicated as "Door open." Now a circuit is completed across all of terminals 338, 340 and 342. The result is clearly seen since now, without the benefit of switches 306 and 388, power is supplied directly to the solenoid coils of both valves 284 and 292. This means that the door will move immediately, under the action of engine 54, to the open position. However, since current remains on the coil at valve 292, without any release, the release of pressure from conduit 208 remains constant, and the door will, therefore, remain constantly open until switch 330 is reset. Just as soon as the switch is reset to either of the other positions, the constant application of current to valve 292 will cease, and the door will then enter upon its operation in the manner previously discussed.

In Figs. 13 to 21, the invention is shown applied to a sliding door. In a construction of this type, a door 368 is carried by hangers 370 and 372. Wheels 374, mounted on the hangers, ride upon a track 376 fixed to a base plate 378 mounted above door opening 380 on wall 382. Also mounted on plate 378 is a differential pneumatic engine 384, held in position by any suitable means, such as clamps 386. A rod 388 extends from the engine.

Adjacent its end, rod 388 carries a reversing switch mechanism 390. Mechanism 390 may comprise a sleeve 392 having a threaded end 394 received upon the threaded end 396 of rod 388. This threaded connection and a suitable lock nut may provide for adjustment of sleeve 392 with relation to rod 388, to determine the end position for rod 388 and the operation of switch mechanism 390 at that end position. The end 396 terminates in a reduced section 398 which is threaded to receive a nut 400, access to which is had through a side opening 402 in a wall of sleeve 392. A spring 404 is coiled around section 398, and abuts against nut 400 at one end, and against the shoulder on a button 408, the head end 410 of which extends through an opening 412 provided in a wall 414 closing the end of sleeve 392. The periphery of the nut may be formed with a plurality of notches, so that, by engagement of a screw driver or similar implement in the notches, the nut may be rotated and thus adjust the effective pressure of spring 404 against button 408. Beyond wall 414, sleeve 392 may have secured thereto or formed therewith a hook member 416 having an opening 418 through which extends an arm 420 which may be formed as a part of hanger 370.

Extending laterally from sleeve 392 is an arm 422 having an opening in which is retained a contactor pin 426. By suitable means, such as threads upon the pin, and lock nuts engaging the pin and holding it in position with relation to arm 422, the position of head 428 is adjusted with relation to button 430 of a switch 431 which may be secured in position upon arm 420 so that button 430 is in line with head 428.

In ordinary operation, spring 404 has enough rigidity to transmit force derived from rod 388 and transmitted thereto by the functioning of engine 384, in the manner to be described, to button 408, and thereby to arm 420, to move the door to closed position. If someone interposes a force to prevent operation of the door to closed position in the usual manner, the resistance to the closing motion of the door, against the action of engine 384, will cause button 408 to move with relation to sleeve 392, and compress spring 404. If the resistance to the movement continues, head 428, which has been moving with relation to button 430, will cause switch 431 to be actuated, for purposes to be described.

Carried on arm 420, above sleeve 392, is a yoke 434. Trained through the slot 436 between the arms of the yoke may be any suitable band or sprocket chain 438. The chain, in turn, is trained over a pair of sprockets 440 and 442. Sprocket 442 may be provided a bearing on plate 378. Carried by chain 438 may be a block 444, positioned so that, under circumstances to be described, the block may come into engagement with the arms of yoke 434.

Sprocket 440 is carried upon a shaft 446 which is provided bearings in a bearing body 448 which forms part of an auxiliary device 450. Device 450 is held in position upon plate 378 by any suitable means, as, for instance, by clamps 452 encircling cylinder bodies 454 and 456 which extend away from bearing body 448. Bearing body 448 may be formed as a coupling having threaded portions into which bodies 454 and 456 are received. Within body 448, shaft 446 has a gear 458 fixed to rotate therewith, the gear being enmeshed with a rack 460.

At one end, within cylinder body 454, rack 460 is formed or otherwise made up to provide a pin 462; the pin has mounted thereon and secured thereto the elements of a piston 464 which may include a leather cup 466 and suitable compressors for holding the leather cup in place upon the pin. That piston is slidable within cylinder body 454 for moving the rack under the action of air obtained from a conduit 468 connected to an opening 470 in a cap 472 closing the end of cylinder 454. Conduit 468 leads to a source of air pressure, which is under controls to be described further.

Rack 460 extends beyond cylinder 454, and beyond the body 448, to terminate in an end pin 474 secured in connection with a guide disk 476. This disk serves as an end member against which bears a coiled spring 478 housed within cylinder 456, which may be closed by a cap 480 against which the other end of spring 478 bears. That cap may have an opening 482 to provide free communication at all times from the interior of cylinder 456 directly to the atmosphere.

The apparatus may be supplied with air under pressure from a suitable source. That source may be directly coupled to conduit 468 so that, so long as air under pressure is being supplied to the apparatus, piston 464 will be driven into cylinder 454 to its limit of movement, thus causing rack 460 to move disk 476 to compress spring 478 within cylinder 456 and simultaneously to rotate gear 458, and move block 444 to its position at the extreme right-hand end of its movement, as shown in full lines in Fig. 13. In this position, as yoke 434 moves with door 368, the yoke will not engage or be engaged by the block. However, in the event of failure of air in conduit 468, rack 460 will drift to the right as spring 478 overcomes the action of piston 464. This movement will cause block 444 to move to the left. If the door is closed, nothing will happen during this stage of movement. If, however, the door is open, spring 478 will be effective to move the door to closed position. Then, in either case, if someone should desire to move the door to open position, he need merely grasp the door and push upon it in the normal manner to move it to open position. Such exertion will cause the door to move to open position, but against the resistance of spring 478. Since air is not being supplied to the apparatus, engine 384 will take no part in this operation.

The source of air from the reservoir, indicated by conduit 468, also connects with port 484 which communicates with chamber 486 in housing 488 forming a part of engine 384. Through a passage 490 in housing 488 is movable rod 388. The rod may be made of tubular metal. At one end of housing 488, passage 490 is enlarged for the reception of packing 500 held in place by a suitable cap 502.

Beyond housing 488 in cylinder 504, a piston structure 506 is assembled upon the end of rod 388. This structure may take any desired form, preferably including a leather cup 508 and packing 510 retained in position in any desired manner. Air entering housing 488 and into chamber 486 will tend to move piston structure 506 through cylinder 504 toward cap 512. Cap 512 which closes the end of the cylinder has a passage 514 with which communicates a conduit 516 from a magnet valve 518. The valve preferably is of the exhaust type, and is positioned to govern the supply of air from conduit 468 to cylinder 504. When valve 518 is energized by the circuit to be discussed, it opens a port from cylinder 504 to the atmosphere, and cuts off flow of air from conduit 468 to the cylinder. Air within cylinder 504 may then exhaust to the atmosphere. In such case, the compressed air constantly supplied to chamber 486 through port 484 will become effective to drive rod 388 to a position to open door 368. Carried by rod 388 is a valve member 520 which is slidable in bore 522 within rod 388. A sleeve 524 threadedly received in bore 522 serves as an end stop for a washer 526 held at the end of member 520 within bore 522 to limit the movement of member 520 with relation to rod 388. Spring 528 within bore 522, engaged against washer 526, and at the other end against the sealed end of bore 522, serves to retain member 520 projected from bore 522.

At the free end of member 520 a pair of valve seating members 530 and 532 are held in place by any suitable means. At cap 512, a seat 534 is provided for engagement by member 530. Thus, as piston structure 506 moves toward cap 512, air has first been exhausted from cylinder 504 by the opening of the port to the atmosphere by valve 518. However, member 530 quickly engages seat 534 and closes off the opening through the cap against free movement of air from cylinder 504. A by-pass 536 is provided through cap 512 into passage 514. Thus continued movement of piston structure 506 will be cushioned by air trapped in cylinder 504, and as it leaks through by-pass 536. Finally, all of the air in the cylinder will be expelled, and seating member 532 will be covered over and engaged by sleeve 524 at the very limit of the opening movement of the door. When pressure is reestablished in cylinder 504 by deenergization of valve 518, rod 388 will be driven to move the door to closed position by the air entering through passage 514 and causing piston structure 506 to overcome the pressure in chamber 486 against the same piston structure.

To control the movement of the door, to prevent slamming and to permit the engine sufficient time in which to cause the door to "coast" to the end position, an electrical circuit arrangement is associated with the door, and made effective by the movement of the door. Current is supplied to the apparatus from a power source through mains 538 and 540. A suitable main cut-off switch 542 may be positioned to control the circuit by controlling one of the mains. Fixed to be carried between hangers 370 and 372 is an insulating base 544 upon which are arranged a plurality of tracks 546, 548 and 550. Carried by and insulated from plate 378 and suspended so that, by their independent springs, they will make contact with the respective tracks, are a plurality of shoes or brushes 552, 554 and 556, which thus remain stationary with relation to the door opening. One main 538 is connected to brush 554. The other main is connected, through the coil of a time delay unit 560, with brush 556.

All of the brushes are in engagement with their respective tracks 546, 548 and 550 at all times. However, track 546 (top) consists of two segments, one a conducting segment 562, and the other a non-conducting segment 564. Segment 564 is at the position where brush 552 will engage at the end of the opening movement of the door. Segment 562 is connected, by means of a jumper 565, with track 548. Track 548 is connected to one side of a switch 566, which may be a part of a door plate 568 located upon the door. This operating plate may be carried upon the door panel beside the door, if desired. However, in the construction shown, the switch is carried by and is movable with the door. The other terminal of this switch is carried to track 550. Now, if someone should actuate this switch by manipulating plate 568 in any well known manner, a circuit will be closed through tracks 548 and 550, through the respective brushes and the coil of the time delay unit 560, which is thus energized to close switch 570, and at the same time to charge a condenser or, in some similar manner, as, for instance, as described for switch 308, to build up a delay for the operation of switch 570 to permit the switch to remain closed even though the circuit at switch 566 should now be broken.

With the closing of the circuit at switch 510, power passes to energize valve 518, and engine 384 is energized to open the door, the opening action of the door being cushioned in the manner heretofore described. Brushes 552, 554 and 556 move over their respective tracks. At the same time, switch 431 is released by disengagement of head 428 from button 430.

One lead from switch 570 goes to the coil of valve 518, while the other lead from the coil of valve 518 goes to brush 552. This brush will ride over track 546. Therefore, at the end of the opening movement for the door, brush 552 will ride onto non-conducting segment 564, and break the circuit for valve 518. Thus, in the event that time delay unit 560 is not functioning to break the circuit at switch 570 by the time the door has moved to fully open position, or if, for some reason, the opening movement of the door is not completed within the time for which unit 560 is set, the break in track 546 will function as a limit switch, as the brush rides to the non-conducting segment 564, cutting valve 518 out of circuit. The door will coast to a halt, against the now reversed effort of engine 384, and then engine 384 will move the door reversely to closed position.

On the other hand, switch mechanism 390, on the door, is connected in series circuit with circuit cut-out switch 572 which functions in the same manner as switch 352 (Fig. 12), that is, to cut switch 431 out of circuit when the door reaches the end of its door closing movement. Switch 572 is normally closed so as not to interfere with the functioning of switch 390 to reverse the door closing movement when some force prevents the closing of the door except at the very last moment of the door closing movement. This switch, in this case, is shown mounted upon the door, while the actuator for the switch, that is, a spring pressed strike button 574 to move it to break the circuit for switch 431, is slidably carried upon the door frame. Thus, when the door reaches the end of its closing movement, switch 572 is opened first, before switch 431 can be actuated, and thereby switch 431 will be made ineffective. This circuit including switches 431 and 572 is connected in parallel circuit with switch 566.

If resistance is encountered to the closing movement of the door, switch mechanism 390 will close the circuit through the normally closed switch 572 to energize the coil of time delay unit 560, thereby to energize valve 518. However, at the end of the closing movement, as the door approaches completely closed position, switch 572 is caused to open, in the manner previously discussed, and thus actuation of switch mechanism 390 with the closing of the door will be ineffective to operate time delay unit 560 for causing the door again to open.

It can be understood that the motive means for opening and closing the door, and for placing the springs under compression until failure occurs may take the form of operating means other than pneumatic engines. For instance, hydraulic engines or electric motors may be substituted for the pneumatic engines here described.

Many other changes could be effected in the particular construction, and in the methods of use and construction, and in specific details thereof, hereinbefore set forth, without substantially departing from the invention defined in the claims, the specific description being merely of an embodiment capable of illustrating certain principles of the invention.

What is claimed as new and useful is:

1. In combination, a door, means for resisting and yet permitting the opening of the door but normally tending to move the door to closed position, means for moving the door to open position independently of any resistance on the part of said resisting means, a source of energy for the door opening means, means for controlling the energy from the source to the door opening means, and means for applying energy from said source to said resisting means to make the resisting means ineffective so long as the source of energy remains effective.

2. In combination, a door, resilient means for resisting and yet permitting the opening of the door but normally tending to move the door to closed position, means for moving the door to open position independently of any resistance on the part of said resisting means, a source of energy for the door opening means, means for controlling the energy from the source to the door opening means, and means for applying energy from said source to said resisting means to make the resilient means ineffective so long as the source of energy remains effective.

3. In combination, a door, a spring for resisting and yet permitting the opening of the door but normally tending to move the door to an end position, means for operating the door to either of a plurality of end positions independently of any resistance on the part of said resisting means, a source of energy for the operating means, means for controlling the energy from the source to the operating means, and means for applying energy from said source to said resisting means to make the spring ineffective so long as the source of energy remains effective.

4. In combination with a door movable with relation to a doorway, a pair of engines, mechanism for imparting movement to the door away from and toward open-barring position, means capable normally of imparting force to the mechanism to move the door in doorway-closing movement, one of the engines being arranged to move the door positively through the mechanism, the other engine being arranged to counteract the force-imparting means, and means for supplying energy simultaneously to both engines to leave the first engine free to control movement of the door to its various positions while at the same time constituting the sole instrumentality for maintaining said force-imparting means inapplicable to move the door.

CYRUS W. BASSETT.
JOHN H. VANDER VEER.
ALBERT E. WEIGELE.

References Cited in the file of this patent

UNITED STATES PATENTS

| Number | Name | Date |
| --- | --- | --- |
| 1,037,267 | Knight | Sept. 3, 1912 |
| 1,874,903 | Conway | Aug. 30, 1932 |
| 1,928,698 | Morris | Oct. 3, 1933 |
| 1,946,577 | Fazendin | Feb. 13, 1934 |
| 1,949,645 | Conklin | Mar. 6, 1934 |
| 2,127,376 | Purdy | Aug. 16, 1938 |
| 2,130,764 | Conklin | Sept. 20, 1938 |
| 2,343,316 | NewKirk | Mar. 7, 1944 |
| 2,504,408 | Griffin | Apr. 18, 1950 |